United States Patent
Doi et al.

(10) Patent No.: US 8,022,131 B2
(45) Date of Patent: Sep. 20, 2011

(54) WATER-BASED INKS FOR INK-JET PRINTING

(75) Inventors: Yasuhiro Doi, Wakayama (JP); Yasushi Ito, Wakayama (JP); Shigeki Nagashima, Wakayama (JP)

(73) Assignee: Kao Corporation, Tokyo (JP)

(*) Notice: Subject to any disclaimer, the term of this patent is extended or adjusted under 35 U.S.C. 154(b) by 6 days.

(21) Appl. No.: 12/714,059

(22) Filed: Feb. 26, 2010

(65) Prior Publication Data

US 2010/0152367 A1 Jun. 17, 2010

Related U.S. Application Data

(63) Continuation of application No. 11/816,953, filed as application No. PCT/JP2006/305068 on Mar. 8, 2006, now abandoned.

(30) Foreign Application Priority Data

Mar. 8, 2005 (JP) ................................. 2005-064046

(51) Int. Cl.
| | |
|---|---|
| C08J 3/02 | (2006.01) |
| C08K 5/00 | (2006.01) |
| C08K 3/00 | (2006.01) |
| B05D 7/00 | (2006.01) |
| C04B 24/26 | (2006.01) |
| C08G 67/02 | (2006.01) |
| C08L 31/00 | (2006.01) |
| C08L 33/06 | (2006.01) |
| B60C 1/00 | (2006.01) |

(52) U.S. Cl. ........ 524/501; 524/515; 524/522; 524/523; 524/612; 524/556; 524/570; 524/424; 524/560

(58) Field of Classification Search .................. 523/160, 523/161; 524/501, 515, 522, 523, 612, 556, 524/570, 424, 560
See application file for complete search history.

(56) References Cited

U.S. PATENT DOCUMENTS

| | | | |
|---|---|---|---|
| 5,489,645 A * | 2/1996 | Tahara et al. ................. | 524/817 |
| 6,740,152 B1 | 5/2004 | Fukuda | |
| 6,758,559 B1 | 7/2004 | Nakano et al. | |
| 2001/0023265 A1* | 9/2001 | Hidaka et al. ................. | 523/161 |
| 2002/0077385 A1* | 6/2002 | Miyabayashi ................ | 523/160 |
| 2005/0035021 A1* | 2/2005 | Higer et al. ................. | 206/524.8 |
| 2005/0036021 A1 | 2/2005 | Ito et al. | |
| 2008/0097015 A1 | 4/2008 | Doi et al. | |
| 2009/0005473 A1 | 1/2009 | Doi et al. | |
| 2009/0068361 A1 | 3/2009 | Doi et al. | |

FOREIGN PATENT DOCUMENTS

| | | |
|---|---|---|
| EP | 0869160 | 10/1998 |
| EP | 1158030 | 11/2001 |
| JP | 10-279870 | 10/1998 |
| JP | 11-12512 | 1/1999 |
| JP | 2000-191967 | 7/2000 |
| JP | 2001-123097 | 5/2001 |
| WO | WO 2006038726 | * 4/2006 |

OTHER PUBLICATIONS

U.S. Appl. No. 13/036,366, filed Feb. 28, 2011, Doi, et al.
Japanese Office Action issued Nov. 16, 2010, in Patent Application No. 2006-055345 (with English-language translation).

* cited by examiner

*Primary Examiner* — Basia Ridley
*Assistant Examiner* — Alexander C Kollias
(74) *Attorney, Agent, or Firm* — Oblon, Spivak, McClelland, Maier & Neustadt, L.L.P.

(57) ABSTRACT

The present invention relates to a water-based ink for ink-jet printing which not only satisfies a high optical density but also exhibits excellent high lighter-fastness and gloss; and a water dispersion used for the water-based ink. There are provided a water dispersion for ink-jet printing containing (A) a self-dispersible pigment, (B) self-emulsifiable polymer particles containing a constitutional unit derived from a salt-forming group-containing monomer, and (C) emulsion polymer particles; and a water-based ink containing the water dispersion.

11 Claims, No Drawings

WATER-BASED INKS FOR INK-JET PRINTING

FIELD OF THE INVENTION

The present invention relates to water-based inks for ink-jet printing, and water dispersions used for the water-based inks.

BACKGROUND OF THE INVENTION

In ink-jet printing methods, droplets of ink are directly projected onto a recording medium from very fine nozzles and allowed to adhere to the recording medium, to form characters and images. The ink-jet printing methods have been rapidly spread because of their various advantages such as easiness of full coloration, low costs, capability of using ordinary paper as the recording medium, non-contact with printed images and characters, etc.

Among such printing methods, in view of enhancing the weather resistance and water resistance of printed images and characters, an ink-jet printing method utilizing an ink containing a pigment as the colorant has now come to dominate. Further, there have been some proposals for improving the water-based inks for ink-jet printing.

For example, there have been disclosed a recording solution to which an emulsion obtained by conducting polymerization in the presence of a reactive surfactant is added to prevent clogging of nozzles with pigments (refer to JP 2002-294105A), and an ink composition that contains polymer particles containing a polyalkoxyalkylene derivative, etc., and a self-dispersible pigment to improve a high lighter-fastness and a rubbing resistance thereof (refer to JP 2001-329199A).

In addition, there have also been disclosed a recording solution containing a pigment and two or more kinds of fine resin particles having the same polarity when dispersed (refer to JP 2001-81366M, and a recording solution containing a self-dispersible pigment containing a hydrophilic group and two or more kinds of fine resin particles containing a hydrophilic group which is the same in kind as that contained in the pigment (refer to JP 2004-189879A).

SUMMARY OF THE INVENTION

The present invention relates to:

(1) A water dispersion for ink-jet printing containing (A) a self-dispersible pigment, (B) self-emulsifiable polymer particles containing a constitutional unit derived from a salt-forming group-containing monomer, and (C) emulsion polymer particles; and (2) a water-based ink for ink-jet printing containing the water dispersion as defined in the above (1).

DETAILED DESCRIPTION OF THE INVENTION

Although conventional inks have been improved in ejection stability, etc., to some extent, these inks are still required to exhibit a more excellent performance such as a high lighter-fastness (resistance to staining of printed characters or images when traced with an aqueous fluorescent marker) and a gloss.

The present invention relates to a water-based ink for ink-jet printing which not only satisfies a high optical density but also exhibits excellent high lighter-fastness and gloss; and a water dispersion used for the water-based ink.

The present inventors have found that a water dispersion containing a self-dispersible pigment and specific two kinds of polymer particles provides a water-based ink for ink-jet printing having a sufficient optical density as well as excellent high lighter-fastness and gloss.

The water dispersion for ink-jet printing according to the present invention is characterized by containing (A) a self-dispersible pigment, (B) self-emulsifiable polymer particles containing a constitutional unit derived from a salt-forming group-containing monomer, and (C) emulsion polymer particles. The respective components of the water dispersion are explained below.

(A) Self-Dispersible Pigment

The "self-dispersible pigment" means a pigment onto a surface of which at least one anionic or cationic hydrophilic group is bonded either directly or through the other atom group to thereby allow the pigment to be dispersed in an aqueous medium without using a surfactant or a resin. Examples of the other atom group include an alkylene group having 1 to 24 carbon atoms and preferably 1 to 12 carbon atoms, a substituted or unsubstituted phenylene group and a substituted or unsubstituted naphthylene group.

As the anionic hydrophilic group, any optional groups may be used as long as they exhibit a high hydrophilic property sufficient to allow the pigment particles to be stably dispersed in the aqueous medium. Specific examples of the anionic hydrophilic group include a carboxyl group ($-COOM^1$), a sulfonic group ($-SO_3M^1$), a phosphoric group ($-PO_3M^1_2$), $-SO_2NH_2$, $-SO_2NHCOR^1$, and dissociated ions thereof such as $-COO^-$, $-SO_3^-$, $-PO_3^{2-}$ and $-PO_3^-M^1$.

In the above chemical formulas, $M^1$ may be the same or different. Examples of $M^1$ include a hydrogen atom; alkali metals such as lithium, sodium and potassium; an ammonium group; and organic ammonium groups such as monomethyl ammonium, dimethyl ammonium, trimethyl ammonium, monoethyl ammonium, diethyl ammonium, triethyl ammonium, monomethanol ammonium, dimethanol ammonium and trimethanol ammonium.

$R^1$ is an alkyl group having 1 to 12 carbon atoms, a substituted or unsubstituted phenyl group or a substituted or unsubstituted naphthyl group.

Among these anionic hydrophilic groups, preferred are a carboxyl group ($-COOM^1$) and a sulfonic group ($-SO_3M^1$).

Examples of the cationic hydrophilic group include an ammonium group and an amino group. Among these cationic hydrophilic groups, preferred are quaternary ammonium groups. In particular, the cationic hydrophilic group is more preferably at least one group selected from the group consisting of those groups represented by the general formula (1):

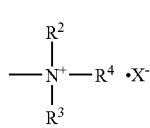

(1)

wherein $R^2$, $R^3$ and $R^4$ are each independently a hydrogen atom or $R^1$ as defined above; X is an anionic group obtained by removing a proton from a halogen atom such as fluorine and chlorine, a carboxylic acid such as acetic acid, propionic acid, lactic acid, glycolic acid, gluconic acid and glyceric acid, or an alkyl sulfate having 1 to 8 carbon atoms, and those group represented by the following formulae:

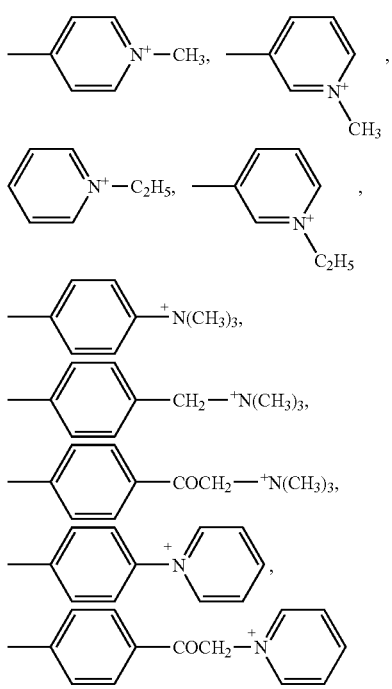

The pigment used in the self-dispersible pigment is not particularly limited, and may be either organic or inorganic. The organic or inorganic pigment may be used in combination with an extender pigment, if required.

Examples of the inorganic pigments include carbon blacks, metal oxides, metal sulfides and metal chlorides. Among these inorganic pigments, carbon blacks are preferably used for black water-based inks. The carbon blacks may include furnace blacks, thermal lamp blacks, acetylene blacks and channel blacks.

The organic pigment is preferably used for color water-based inks. Examples of the organic pigments include azo pigments, disazo pigments, phthalocyanine pigments, quinacridone pigments, isoindolinone pigments, dioxazine pigments, perylene pigments, perinone pigments, thioindigo pigments, anthraquinone pigments and quinophthalone pigments.

More specifically, as the organic pigment, there is preferably used at least one pigment selected from the group consisting of those pigments which are commercially available under various product numbers of C.I. Pigment Yellow, C.I. Pigment Red, C.I. Pigment Violet, C.I. Pigment Blue and C.I. Pigment Green.

Examples of the extender pigment include silica, calcium carbonate and talc.

In order to render the pigment self-dispersible, a necessary amount of the above anionic or cationic hydrophilic group may be chemically bonded to a surface of the pigment. The hydrophilic group may be bonded to the surface of the pigment by any optional known method, for example, by the methods described in U.S. Pat. Nos. 5,571,311, 5,630,868 and 5,707,432; J. E. Johnson, "Imaging Science and Technology's 50th Annual Conference (1997)"; Yuan Yu, "Imaging Science and Technology's 53rd Annual Conference (2000)"; and "Polyfile", 1248 (1996).

More specifically, there may be used the method of introducing a carboxyl group into the pigment using compounds, e.g., acids having an oxidizing property such as nitric acid, hydrogen peroxide, hypochlorous acid and chromic acid; the method of introducing a sulfone group into the pigment by thermal decomposition of persulfate compounds; and the method of introducing the above anionic hydrophilic group into the pigment using diazonium compounds containing a carboxyl group, a sulfone group or an amino group, though not limited thereto.

The content of the anionic or cationic hydrophilic group is not particularly limited, and is preferably from 50 to 5,000 µmol/g and more preferably from 100 to 3,000 µmol/g per one gram of the self-dispersible pigment.

The average particle size of the self-dispersible pigment in the water dispersion or the water-based ink is preferably from 40 to 300 nm and more preferably from 50 to 200 nm in view of a good stability of the resultant dispersion. Meanwhile, the average particle size of the self-dispersible pigment may be measured using a laser particle analyzing system "ELS-8000" (cumulant analysis) available from Otsuka Denshi Co., Ltd. The measurement is conducted at a temperature of 25° C., an angle between incident light and detector of 90° and a cumulative frequency of 100 times by inputting a refractive index of water (1.333) to the analyzing system as a refractive index of the dispersing medium.

Examples of the commercially available anionic self-dispersible pigment (carbon black) include "CAB-O-JET 200" and "CAB-O-JET 300" both available from Cabot Corp., "BONJET CW-1" and "BONJET CW-2" both available from Orient Chemical Industries Co., Ltd., and "Aqua-Black 162" (carboxyl group content: about 800 µmol/g) available from Tokai Carbon Co., Ltd.

These self-dispersible pigments may be used alone or in combination of any two or more thereof at an optional mixing ratio.

(B) Self-Emulsifiable Polymer Particles

The "self-emulsifiable polymer particles (B)" used in the present invention which contain the constitutional unit derived from the salt-forming group-containing monomer, mean particles of a water-insoluble polymer which is kept in an emulsified state in water in the absence of a surfactant owing to the effect of a functional group (in particular, a basic group or a salt thereof) contained in the polymer itself (hereinafter referred to merely as "self-emulsifiable polymer (B)" or "self-emulsifiable polymer particles (B)"). An emulsion containing the self-emulsifiable polymer particles (B) may be produced, for example, by such a method in which a solution or dispersion prepared by dissolving or dispersing the polymer in a solvent is directly charged into water without adding any surfactant thereto, and then after neutralizing a salt-forming group contained in the polymer, the solution or dispersion containing the neutralized polymer is stirred and mixed and then subjected to removal of the solvent therefrom to obtain the aimed emulsion.

Here, the "emulsified state" means such a condition in which a stable emulsified or dispersed state of a mixture produced by mixing and stirring a solution prepared by dissolving 30 g of the water-insoluble polymer in 70 g of an organic solvent such as methyl ethyl ketone, a neutralizing agent which is capable of neutralizing 100% of the salt-forming group in the water-insoluble polymer (sodium hydroxide for the anionic salt-forming group or acetic acid for the cationic salt-forming group), and 200 g of water with each other at 25° C. for 30 min, can be confirmed by naked eyes even after the mixture from which the organic solvent is removed is allowed to stand at 25° C. for at least one week.

(Water-Insoluble Polymer)

The "water-insoluble polymer" used herein means a polymer exhibiting a solubility in water of 10 g or lower, preferably 5 g or lower and more preferably 1 g or lower when the polymer is dried at 105° C. for 2 h and then dissolved in 100 g of water at 25° C. The solubility means a solubility in water of the water-insoluble polymer whose salt-forming groups are neutralized completely (100%) with sodium hydroxide or acetic acid according to kinds of the salt-forming groups to be neutralized.

Examples of the water-insoluble polymer include water-insoluble vinyl polymers, water-insoluble ester-based polymers and water-insoluble urethane-based polymers. Among these water-insoluble polymers, preferred are water-insoluble vinyl polymers.

The water-insoluble vinyl polymer is preferably produced by copolymerizing a monomer mixture containing a salt-forming group-containing monomer (a) (hereinafter occasionally referred to merely as a "component (a)"), and a macromer (b) (hereinafter occasionally referred to merely as a "component (b)") and/or a hydrophobic monomer (c) (hereinafter occasionally referred to merely as a "component (c)") by a solution polymerization method (the mixture is hereinafter occasionally referred to merely as a "monomer mixture"). The thus produced water-insoluble polymer contains a constitutional unit derived from the component (a), and a constitutional unit derived from the component (b) and/or a constitutional unit derived from the component (c).

The salt-forming group-containing monomer (a) is used for promoting the self-emulsification and enhancing a dispersion stability of the resultant dispersion. Examples of the salt-forming group include a carboxyl group, a sulfonic group, a phosphoric group, an amino group and an ammonium group.

The salt-forming group-containing monomer includes cationic monomers and anionic monomers. Examples of the salt-forming group-containing monomer include those described on page 5, from column 7, line 24 to column 8, line 29 of JP 9-286939A.

Typical examples of the cationic monomers include unsaturated amine group-containing monomers and unsaturated ammonium salt group-containing monomers. Among these cationic monomers, preferred are N,N-dimethylaminoethyl (meth)acrylate, N—(N',N'-dimethylaminopropyl)(meth)acrylamide and vinyl pyrrolidone.

Typical examples of the anionic monomers include unsaturated carboxylic acid monomers, unsaturated sulfonic acid monomers and unsaturated phosphoric acid monomers.

Examples of the unsaturated carboxylic acid monomers include acrylic acid, methacrylic acid, crotonic acid, itaconic acid, maleic acid, fumaric acid, citraconic acid and 2-methacryloyloxymethylsuccinic acid. Examples of the unsaturated sulfonic acid monomers include styrenesulfonic acid, 2-acrylamido-2-methylpropanesulfonic acid, 3-sulfopropyl (meth)acrylate and bis(3-sulfopropyl)itaconic esters. Examples of the unsaturated phosphoric acid monomers include vinylphosphonic acid, vinyl phosphate, bis(methacryloxyethyl)phosphate, diphenyl-2-acryloyloxyethyl phosphate, diphenyl-2-methacryloyloxyethyl phosphate and dibutyl-2-acryloyloxyethyl phosphate.

Among the above anionic monomers, in view of a good dispersion stability and a good ejecting stability of the resultant inks, preferred are the unsaturated carboxylic acid monomers, and more preferred are acrylic acid and methacrylic acid.

The macromer (b) is used for enhancing a gloss of the resultant prints as well as a dispersion stability of the polymer particles. The macromer (b) may be in the form of a monomer containing a polymerizable unsaturated group which has a number-average molecular weight of from 500 to 100,000 and preferably from 1,000 to 10,000. Meanwhile, the number-average molecular weight of the macromer (b) may be measured by gel chromatography using chloroform containing 1 mmol/L of dodecyl dimethylamine as a solvent and using polystyrene as a standard substance.

Among these macromers (b), in view of a good dispersion stability of the polymer particles, etc., preferred are styrene-based macromers and aromatic group-containing (meth)acrylate-based macromers which have a polymerizable functional group at one terminal end thereof.

Examples of the styrene-based macromer include homopolymers of styrene-based monomers, and copolymers of the styrene-based monomers with other monomers. Examples of the styrene-based monomers include styrene, 2-methyl styrene, vinyl toluene, ethylvinyl benzene, vinyl naphthalene and chlorostyrene.

As the aromatic group-containing (meth)acrylate-based macromers, there are preferably used homopolymers of an aromatic group-containing (meth)acrylate and copolymers of the aromatic group-containing (meth)acrylate with other monomers. Examples of the aromatic group-containing (meth)acrylate include (meth)acrylates containing an arylalkyl group having 7 to 22 carbon atoms, preferably 7 to 18 carbon atoms and more preferably 7 to 12 carbon atoms which may have a substituent group containing a hetero atom, and (meth)acrylates containing an aryl group having 6 to 22 carbon atoms, preferably 6 to 18 carbon atoms and more preferably 6 to 12 carbon atoms which may have a substituent group containing a hetero atom. Examples of the substituent group containing a hetero atom include a halogen atom, an ester group, an ether group and a hydroxyl group. Specific examples of the aromatic group-containing (meth)acrylate include benzyl(meth)acrylate, phenoxyethyl(meth)acrylate, 2-hydroxy-3-phenoxypropyl acrylate and 2-methacryloyloxyethyl-2-hydroxypropyl phthalate. Among these aromatic group-containing (meth)acrylates, preferred is benzyl(meth)acrylate.

The polymerizable functional group bonded to one terminal end of these macromers is preferably an acryloyloxy group or a methacryloyloxy group. Examples of the preferred other monomers copolymerized with the aromatic group-containing (meth)acrylate include acrylonitrile.

The content of the constitutional unit derived from the styrene-based monomer in the styrene-based macromer or the constitutional unit derived from the aromatic group-containing (meth)acrylate in the aromatic group-containing (meth)acrylate-based macromer is preferably 50% by weight or higher and more preferably 70% by weight or higher in view of enhancing an affinity to the pigment.

The macromer (b) may have a side chain containing the other constitutional unit derived from an organopolysiloxane, etc. Such a side chain may be produced, for example, by copolymerizing the macromer (b) with a silicone-based macromer having a polymerizable functional group at one terminal end thereof which is represented by the following formula (2):

$$CH_2=C(CH_3)—COOC_3H_6—[Si(CH_3)_2—O]_t—Si(CH_3)_3 \qquad (2)$$

wherein t is a number from 8 to 40.

The styrene-based macromer as the component (b) is commercially available, for example, from Toagosei Co., Ltd., as product names of AS-6(S), AN-6(S), HS-6(S), etc.

The hydrophobic monomer (c) is used for enhancing an optical density, a high lighter-fastness and a gloss of characters or images printed. Examples of the hydrophobic monomer include alkyl(meth)acrylates and aromatic group-containing monomers.

Examples of the preferred alkyl(meth)acrylates include those containing an alkyl group having 1 to 22 carbon atoms and preferably 6 to 18 carbon atoms. Specific examples of the alkyl(meth)acrylates include methyl(meth)acrylate, ethyl (meth)acrylate, (iso)propyl(meth)acrylate, (iso- or tertiary-) butyl(meth)acrylate, (iso)amyl(meth)acrylate, cyclohexyl (meth)acrylate, 2-ethylhexyl(meth)acrylate, (iso)octyl(meth) acrylate, (iso)decyl(meth)acrylate, (iso)dodecyl(meth) acrylate and (iso)stearyl(meth)acrylate.

Meanwhile, the terms "(iso- or tertiary-)" and "(iso)" used herein mean both the structure in which the groups expressed by "iso" and "tertiary" are present, and the structure in which these groups are not present (i.e., normal). Also, the term "(meth)acrylate" used herein means acrylate, methacrylate or both thereof.

Examples of the preferred aromatic group-containing monomer include vinyl monomers containing an aromatic group having 6 to 22 carbon atoms and more preferably 6 to 12 carbon atoms which may contain a substituent group having a hetero atom. Specific examples of the preferred aromatic group-containing monomer include the above styrene-based monomer (component (c-1)), and the above aromatic group-containing (meth)acrylate (component (c-2)). Examples of the substituent group having a heteroatom are those exemplified above.

Among these components (c), preferred is the styrene-based monomer (component (c-1)) in view of enhancing a gloss and an optical density of characters or images printed on a coated paper. Examples of the styrene-based monomer include those exemplified above. Among these styrene-based monomers, preferred are styrene and 2-methyl styrene. The content of the component (c-1) in the component (c) is preferably from 10 to 100% by weight and more preferably from 20 to 80% by weight in view of enhancing the optical density and the gloss.

Also, examples of the preferred aromatic group-containing (meth)acrylate as the component (c-2) include those exemplified above. Among these aromatic group-containing (meth)acrylates, preferred are benzyl(meth)acrylate and phenoxyethyl(meth)acrylate. The content of the component (c-2) in the component (c) is preferably from 10 to 100% by weight and more preferably from 20 to 80% by weight in view of enhancing the gloss. Further, the components (c-1) and (c-2) may be suitably used in combination with each other.

The monomer mixture may further contain (d) a hydroxyl-containing monomer (hereinafter referred to merely as a "component (d)") for enhancing a dispersion stability of the resultant polymer particles. The component (d) exhibits an excellent effect of enhancing the dispersion stability and improving the high lighter-fastness for a short period of time upon printing.

Examples of the component (d) include 2-hydroxyethyl (meth)acrylate, 3-hydroxypropyl(meth)acrylate, polyethylene glycol (n=2 to 30 wherein n represents an average molar number of addition of oxyalkylene groups: this definition is similarly applied to the subsequent descriptions) (meth)acrylate, polypropylene glycol (n=2 to 30) (meth)acrylate and poly(ethylene glycol (n=1 to 15)/propylene glycol (n=1 to 15)) (meth)acrylate. Among these components (d), preferred are 2-hydroxyethyl(meth)acrylate, polyethylene glycol monomethacrylate and polypropylene glycol methacrylate.

The monomer mixture may further contain (e) a monomer represented by the following general formula (3) (hereinafter occasionally referred to merely as a "component (e)"):

(3)

wherein $R^5$ is a hydrogen atom or a lower alkyl group having 1 to 5 carbon atoms; $R^6$ is a divalent hydrocarbon group having 1 to 30 carbon atoms which may contain a hetero atom; $R^7$ is a monovalent hydrocarbon group having 1 to 30 carbon atoms which may contain a hetero atom; and p represents an average molar number of addition, and is a number from 1 to 60 and preferably a number from 1 to 30.

The component (e) exhibits an excellent effect of enhancing an ejection stability of the resultant water-based ink and preventing occurrence of slippage of characters or images printed even upon continuous printing.

In the general formula (3), examples of the hetero atom include a nitrogen atom, an oxygen atom, a halogen atom and a sulfur atom.

Examples of the suitable $R^5$ group include methyl, ethyl and (iso)propyl.

Examples of the suitable $R^6O$ group include oxyalkylene groups having 2 to 7 carbon atoms such as an oxyethylene group, an oxy(iso)propylene group, an oxytetramethylene group, an oxyheptamethylene group, an oxyhexamethylene group, and combination of at least two of these oxyalkylene groups.

Examples of the suitable $R^7$ group include aliphatic alkyl groups having 1 to 30 carbon atoms and preferably 1 to 20 carbon atoms, aromatic ring-containing alkyl groups having 7 to 30 carbon atoms, and hetero ring-containing alkyl groups having 4 to 30 carbon atoms.

Specific examples of the component (e) include methoxy polyethylene glycol (p in the general formula (3): 1 to 30; this is similarly applied to the subsequent descriptions) (meth)acrylate, methoxy polytetramethylene glycol (p=1 to 30) (meth)acrylate, ethoxy polyethylene glycol (p=1 to 30) (meth)acrylate, octoxy polyethylene glycol (p=1 to 30) (meth)acrylate, polyethylene glycol (p=1 to 30) (meth)acrylate 2-ethylhexyl ether, (iso)propoxy polyethylene glycol (p=1 to 30) (meth)acrylate, butoxy polyethylene glycol (p=1 to 30) (meth)acrylate, methoxy polypropylene glycol (p=1 to 30) (meth)acrylate, and methoxy (ethylene glycol/propylene glycol copolymer) (p=1 to 30: among which the number of ethylene glycol constitutional units is 1 to 29) (meth)acrylate. Among these compounds, preferred are octoxy polyethylene glycol (p=1 to 30) (meth)acrylate and polyethylene glycol (p=1 to 30) (meth)acrylate 2-ethylhexyl ether.

Specific examples of commercially available products of the components (d) and (e) include polyfunctional acrylate monomers (NK Esters) available from Shin-Nakamura Kagaku Kogyo Co., Ltd., such as "M-40G", "M-90G", "M-230G" and "EH-4G"; and BLEMMER Series available from NOF Corporation, such as "PE-90", "PE-200", "PE-350", "PME-100", "PME-200", "PME-400", "PME-1000", "PP-500", "PP-800", "PP-1000", "AP-150", "AP-400", "AP-550", "AP-800", "50PEP-300" and "50POEP-800B".

These components (a) to (e) are respectively used alone or in the form of a mixture of any two or more thereof.

Upon production of the water-insoluble vinyl polymer, the contents of the above components (a) to (e) in the monomer mixture (contents of non-neutralized components; this definition is similarly applied to the subsequent descriptions) or the contents of constitutional units derived from the components (a) to (e) in the water-insoluble polymer are as follows.

The content of the component (a) is preferably from 3 to 40% by weight, more preferably from 5 to 30% by weight and most preferably 5 to 20% by weight in view of a good self-emulsifiability and a good dispersion stability of the resultant polymer particles.

The content of the component (b) is preferably from 1 to 25% by weight and more preferably from 5 to 20% by weight in view of a good gloss of images or characters printed on a coated paper as well as a good dispersion stability of the resultant polymer particles.

The content of the component (c) is preferably from 5 to 79% by weight, more preferably 10 to 70% by weight and most preferably from 10 to 60% by weight in view of a good optical density, a good high lighter-fastness and a good gloss of images or characters printed on a coated paper. The components (b) and (c) may be used either in combination or singly. The total content of the components (b) and (c), in particular, the total content of the constitutional unit derived from the aromatic group-containing macromer as the component (b) and/or the constitutional unit derived from the aromatic group-containing monomer as the component (c) is preferably from 45 to 80% by weight, more preferably from 50 to 80% by weight and most preferably from 55 to 75% by weight in view of a good gloss and a good dispersion stability of the resultant polymer particles.

The weight ratio ((a)/[(b)+(c)]) of the component (a) to a sum of the components (b) and (c) in the water-insoluble vinyl polymer is preferably from 0.01 to 1, more preferably from 0.05 to 0.6 and still more preferably from 0.05 to 0.4 in view of a good long-term storage stability and a good ejection property of the resultant ink.

The content of the component (d) is preferably from 5 to 40% by weight and more preferably from 7 to 20% by weight in view of a good dispersion stability of the resultant polymer particles and a good high lighter-fastness.

The content of the component (e) is preferably from 5 to 50% by weight and more preferably from 10 to 40% by weight in view of a good ejection stability of the resultant ink.

The total content of the components (a) and (d) [component (a)+component (d)] in the monomer mixture is preferably from 6 to 60% by weight and more preferably from 10 to 50% by weight in view of a good dispersion stability and a good water resistance of the resultant polymer particles. The total content of the components (a) and (e) [component (a)+component (e)] in the monomer mixture is preferably from 6 to 75% by weight and more preferably from 13 to 50% by weight in view of a good dispersion stability of the resultant polymer particles and a good ejection stability of the resultant ink. The total content of the components (a), (d) and (e) [component (a)+component (d)+component (e)] in the monomer mixture is preferably from 6 to 60% by weight and more preferably from 7 to 50% by weight in view of a good dispersion stability of the resultant polymer particles and a good ejection stability of the resultant ink.

Production of Water-Insoluble Polymer

The water-insoluble polymer capable of providing the self-emulsifiable polymer (B) may be produced by copolymerizing the monomer mixture by known polymerization methods such as solution polymerization and bulk polymerization. Among these polymerization methods, preferred is the solution polymerization.

The solvent for the solution polymerization method is preferably an organic polar solvent, although not limited thereto. The organic polar solvent miscible with water may be used in the form of a mixture with water. Examples of the organic polar solvents include aliphatic alcohols having 1 to 3 carbon atoms such as methanol, ethanol and propanol; ketones such as acetone and methyl ethyl ketone; and esters such as ethyl acetate. Among these solvents, preferred are methanol, ethanol, acetone, methyl ethyl ketone and mixed solvents of at least one thereof with water.

The polymerization may be carried out in the presence of a conventionally known radical polymerization initiator, e.g., azo compounds such as 2,2'-azobisisobutyronitrile and 2,2'-azobis(2,4-dimethylvaleronitrile), and organic peroxides such as t-butyl peroxyoctoate and dibenzoyl oxide. The amount of the radical polymerization initiator to be used is preferably from 0.001 to 5 mol and preferably from 0.01 to 2 mol per 1 mol of the monomer mixture. The polymerization may also be carried out in the presence of a conventionally known chain transfer agent, e.g., mercaptans such as octyl mercaptan and 2-mercapto ethanol, and thiuram disulfides.

The polymerization conditions of the monomer mixture vary depending upon the kinds of radical polymerization initiator, monomers, solvent, etc., to be used, and the polymerization is generally conducted at a temperature of preferably from 30 to 100° C. and more preferably from 50 to 80° C. The polymerization time is preferably from 1 to 20 h. The polymerization is preferably conducted in an atmosphere of an inert gas such as nitrogen and argon.

After completion of the polymerization, the polymer thus produced is isolated from the reaction solution by a known method such as reprecipitation and removal of solvent by distillation. The thus obtained polymer may also be purified by repeated reprecipitation, membrane separation, chromatography, extraction, etc., for removing unreacted monomers, etc., therefrom.

The weight-average molecular weight of the resultant water-insoluble polymer is preferably from 5,000 to 500,000, more preferably from 10,000 to 400,000 and most preferably from 10,000 to 300,000 in view of a good gloss.

Meanwhile, the weight-average molecular weight of the polymer may be measured by gel chromatography using dimethylformamide containing GO mmol/L of phosphoric acid and 50 mmol/L of lithium bromide as a solvent and using polystyrene as a standard substance.

Production of Self-Emulsifiable Polymer Particles (B)

The self-emulsifiable polymer particles (B) are preferably produced in the form of a water dispersion from the above water-insoluble polymer through the following steps (1) and (2):

(1) mixing and stirring a mixture containing the water-insoluble polymer, an organic solvent, a neutralizing agent and an aqueous medium; and (2) removing the organic solvent from the resultant mixture.

In the step (1), first, preferably, the water-insoluble polymer is dissolved in the organic solvent, and then mixed with the aqueous medium containing the neutralizing agent under stirring to obtain a dispersion of an oil-in-water type. Thus, by adding the water-insoluble polymer to the aqueous medium containing the neutralizing agent, a water dispersion of the fine self-emulsifiable polymer particles (B) exhibiting a higher storage stability can be produced without applying a strong shear force thereto.

The method of mixing and stirring the mixture is not particularly limited, and may be carried out using an ordinary mixing and stirring apparatus such as anchor blades, or a dispersing apparatus such as an ultrasonic dispersing device and a high-pressure homogenizer, if desired.

Examples of the preferred organic solvents include alcohol solvents, ketone solvents and ether solvents, i.e., the organic solvents are preferably those having a solubility in water of 10 to 80% by weight as measured at 20° C.

Examples of the alcohol solvents include n-butanol, tertiary butanol, isobutanol and diacetone alcohol. Examples of the ketone solvents include acetone, methyl ethyl ketone, diethyl ketone and methyl isobutyl ketone. Examples of the ether solvents include dibutyl ether and dioxane. Among these solvents, preferred are ketone solvents such as acetone and methyl ethyl ketone.

The aqueous medium means a medium containing water as a main component which may also contain a hydrophilic solvent having a solubility in water of 100% by weight or higher as measured at 20° C.

The content of the organic solvent in the mixture is preferably from 10 to 70% by weight, the content of the water-insoluble polymer in the mixture is preferably from 2 to 40% by weight, and the content of the aqueous medium in the mixture is preferably from 10 to 70% by weight. The method of mixing and stirring the mixture is not particularly limited.

As the neutralizing agent, acids or bases may be used according to the kind of the salt-forming group in the water-insoluble polymer. Examples of the neutralizing agent include acids such as hydrochloric acid, acetic acid, propionic acid, phosphoric acid, sulfuric acid, lactic acid, succinic acid, glycolic acid, gluconic acid and glyceric acid, and bases such as lithium hydroxide, sodium hydroxide, potassium hydroxide, ammonia, methylamine, dimethylamine, trimethylamine, ethylamine, diethylamine, triethylamine, triethanolamine and tributylamine.

The degree of neutralization of the water-insoluble polymer is usually from 10 to 200%, preferably from 20 to 150% and more preferably from 50 to 150%.

When the salt-forming group is an anionic group, the degree of neutralization thereof is calculated according to the following formula:

[weight (g) of neutralizing agent)/equivalent of neutralizing agent]/[acid value of polymer (KOH mg/g)×weight (g) of polymer/(56×1000)]×100

When the salt-forming group is a cationic group, the degree of neutralization thereof is calculated according to the following formula:

[weight (g) of neutralizing agent)/equivalent of neutralizing agent]/[amine value of polymer (HCl mg/g)×weight (g) of polymer/(36.5×1000)]×100

The acid value or amine value may be calculated from the respective constitutional units of the water-insoluble vinyl polymer, or may also be determined by the method of subjecting a solution prepared by dissolving the polymer in an appropriate solvent such as methyl ethyl ketone to titration.

In the step (2), the organic solvent is removed from the dispersion obtained in the above step (1) by known methods such as distillation under reduced pressure to obtain a water dispersion of the self-emulsifiable polymer particles (B). The organic solvent is substantially completely removed from the thus obtained water dispersion. The content of the residual organic solvent in the resultant water dispersion is preferably 0.1% by weight or lower and more preferably 0.01% by weight or lower.

The thus obtained water dispersion of the self-emulsifiable polymer particles (B) has D50 (cumulative 50% value in frequency distribution of scattering intensity when the cumulative percentage is calculated sequentially from smaller particles) of preferably 500 nm or less, more preferably 300 nm or less and most preferably 200 nm or less in view of a good storage stability of the water dispersion. In addition, the lower limit of D50 is preferably 10 nm or more and more preferably 40 nm or more in view of facilitated production of the water dispersion.

The above water dispersion of the self-emulsifiable polymer particles (B) has D90 (cumulative 90% value in frequency distribution of scattering intensity when the cumulative percentage is calculated sequentially from smaller particles) of preferably 2000 nm or less, more preferably 1000 nm or less and most preferably 500 nm or less in view of reducing a content of coarse particles in the water dispersion and enhancing a storage stability of the water dispersion. In addition, the lower limit of D90 is preferably 20 nm or more and more preferably 80 nm or more in view of facilitated production of the water dispersion.

Meanwhile, the measurements of D50 and D90 may be conducted using the above laser particle analyzing system "ELS-8000" (cumulant analysis) available from Otsuka Denshi Co., Ltd., under the same conditions as described above.

(C) Emulsion Polymer Particles

The "emulsion polymer particles (C)" used in the present invention mean fine particles of a polymer obtained by emulsion-polymerizing an ethylenically unsaturated monomer in the presence of a surfactant and/or a reactive surfactant (hereinafter referred to merely as an "emulsion polymer (C)").

The emulsion polymer (C) is preferably produced by emulsion-polymerizing an ethylenically unsaturated monomer such as the components (a) to (e) in the presence of the reactive surfactant by known methods in view of enhancing a high lighter-fastness of the resultant water-based ink.

The content of the constitutional unit derived from the component (a) in the emulsion polymer is preferably from 0.3 to 10% by weight, more preferably from 0.5 to 5% by weight and most preferably from 0.5 to 3% by weight in view of a good dispersion stability of the resultant emulsion polymer particles.

The content of the constitutional unit derived from the component (c) in the emulsion polymer is preferably from 50 to 99.5% by weight, more preferably from 60 to 99.5% by weight and most preferably from 70 to 99% by weight in view of a good dispersion stability of the resultant emulsion polymer particles. The content of the constitutional unit derived from the above aromatic group-containing monomer in the emulsion polymer is preferably from 25 to 85% by weight, more preferably from 30 to 75% by weight and most preferably from 40 to 60% by weight, and the content of the constitutional unit derived from the above alkyl(meth)acrylate in the emulsion polymer is preferably from 10 to 78% by weight, more preferably from 10 to 68% by weight and still more preferably from 20 to 60% by weight, in view of a good high lighter-fastness.

The weight ratio [(a)/(c)] of the component (a) to the component (c) in the emulsion polymer is preferably from 0.003 to 0.5, more preferably from 0.005 to 0.3 and most preferably from 0.01 to 0.1 in view of good storage stability, optical density, high lighter-fastness and ejection property.

In the above emulsion polymerization, there may be used any known polymerization initiators. Examples of the polymerization initiators include inorganic peroxides such as hydrogen peroxide, potassium persulfate and ammonium persulfate; organic peroxides such as cumene hydroperoxide, diisopropylbenzene hydroperoxide and p-menthane hydroperoxide; other organic polymerization initiators, e.g., azo-based initiators such as azobisdiisobutyronitrile and methoxybenzene diazomercaptonaphthalene; and redox polymerization initiators using a peroxide or an oxidizing agent in combination with a reducing agent such as sodium hydrogensulfite, sodium thiosulfate, ferrous sulfate and sugar.

The surfactants used in the above emulsion polymerization are not particularly limited, and are preferably anionic surfactants and nonionic surfactants. Examples of the anionic surfactants include sodium dodecylbenzenesulfonate, sodium laurate, and ammonium salts of polyoxyethylene alkyl ether sulfates. Examples of the nonionic surfactants include polyoxyethylene alkyl ethers, polyoxyethylene alkyl esters, polyoxyethylene sorbitan fatty esters, polyoxyethylene alkyl phenyl ethers, polyoxyethylene alkyl amines and polyoxyethylene alkyl amides. These surfactants may be used alone or in the form of a mixture of any two or more thereof.

The reactive surfactant means a surfactant containing one or more radical-polymerizable unsaturated double bonds in a molecule thereof. The reactive surfactant exhibits an excellent emulsifiability for monomers and, therefore, can produce a water dispersion having an excellent stability, resulting in enhanced high lighter-fastness of the resultant water-based ink.

The reactive surfactant is preferably in the form of an anionic or nonionic surfactant containing at least one hydrophobic group such as linear or branched alkyl or alkenyl groups having 8 to 30 carbon atoms and preferably 12 to 22 carbon atoms, and at least one hydrophilic group such as ionic groups and oxyalkylene groups.

Examples of the alkyl groups include octyl, 2-ethylhexyl, decyl, dodecyl, tetradecyl, hexadecyl, octadecyl and behenyl.

Examples of the alkenyl groups include oleyl and octenyl.

Examples of the ionic groups include cationic groups such as ammonium groups, and anionic groups. Among these ionic groups, preferred are anionic groups, and more preferred are anionic groups such as a carboxyl group, a sulfonic group, a sulfuric group and a phosphoric group and base-neutralized products thereof. The bases used for neutralizing the anionic groups are the same neutralizing agents as exemplified above.

The oxyalkylene groups preferably contain 1 to 4 carbon atoms, and an average polymerization degree of repeating units thereof is preferably from 1 to 100, more preferably from 4 to 80 and mot preferably from 4 to 50. Among these oxyalkylene groups, preferred are an oxyethylene group and/or an oxypropylene group.

When the surfactant contains two or more kinds of oxyalkylene groups, for example, oxyethylene group and oxypropylene group, these groups may be either block-added, random-added or alternate-added. The terminal end group of the oxyalkylene groups is not particularly limited, and may be a hydroxyl group or an alkoxy group such as methoxy and ethoxy.

When the self-emulsifiable polymer particles (B) contain a constitutional unit derived from anionic monomers, the emulsion polymer particles (C) preferably contain a constitutional unit derived from anionic monomers, and the reactive surfactant used in the emulsion polymerization preferably contains an anionic group and/or an oxyalkylene group in view of coagulation stability of the polymer particles. When the self-emulsifiable polymer particles (B) contain a constitutional unit derived from cationic monomers, the emulsion polymer particles (C) preferably contain a constitutional unit derived from cationic monomers, and the reactive surfactant used in the emulsion polymerization preferably contains an cationic group and/or an oxyalkylene group in view of coagulation stability of the polymer particles.

Specific examples of the reactive surfactants include sulfosuccinic ester-based surfactants represented by the following general formulae (4) and (5) such as "LATEMUL S-120P" and "LATEMUL S-180A" both available from Kao Corp., and "ELEMINOL JS-2" available from Sanyo Kasei Kogyo Co., Ltd., and alkyl phenol ether-based surfactants represented by the following general formula (6) such as "AQUALON HS-10" and "AQUALON RN-20" both available from Daiichi Kogyo Seiyaku Co., Ltd.

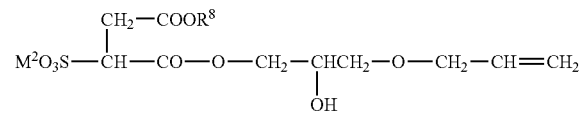

(4)

wherein $M^2$ is Na, K or $NH_4$; and $R^8$ is an alkyl group having 8 to 18 carbon atoms.

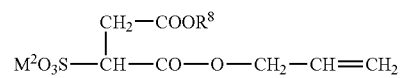

(5)

wherein $M^2$ and $R^8$ have the same meaning as defined in the above formula (4).

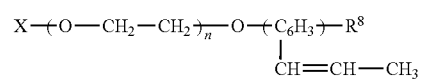

(6)

wherein X is H, $SO_3Na$, $SO_3K$ or $SO_3NH_4$; $R^8$ has the same meaning as defined in the above formula (4); and n is an integer of 1 to 200 and preferably 1 to 50.

Among these reactive surfactants, preferred are those containing anionic groups represented by the above general formulae (4) and (5) in view of facilitated operation of the emulsion polymerization. These reactive surfactants may be used alone or in the form of a mixture of any two or more thereof.

The amount of the reactive surfactant used is usually from 0.1 to 10 parts by weight, preferably from 0.1 to 5 parts by weight and more preferably from 0.1 to 3 parts by weight on the basis of 100 parts by weight of the whole monomers other than the reactive surfactant. When the amount of the reactive surfactant used is 0.1 part by weight or more, the fine polymer particles exhibit a good dispersion stability, resulting in an enhanced ejection property of the resultant water-based ink, whereas when the amount of the reactive surfactant used is 10 parts by weight or less, the resultant prints have a good high lighter-fastness.

Specific examples of the emulsion polymer (C) include (meth)acrylic polymers, vinyl acetate-based polymers, styrene-butadiene-based polymers, vinyl chloride-based polymers, styrene-(meth)acrylic polymers, butadiene-based polymers and styrene-based polymers.

Among these emulsion polymers, preferred are (meth) acrylic polymers, (meth)acrylic-styrene-based polymers and styrene-based polymers, and more preferred (meth)acrylic-styrene-based polymers obtained by copolymerizing a styrene-based monomer with an (meth)acrylic ester.

As monomers used for synthesizing the (meth)acrylic polymers or the (meth)acrylic-styrene-based polymers, there are preferably used the (meth)acrylic group-containing monomers as the salt-forming group-containing monomers (a), the hydrophobic monomers (b) and the hydroxyl-containing monomers (d) as exemplified above.

Among these monomers, preferred are (meth)acrylic esters. Examples of the preferred (meth)acrylic esters include the above alkyl(meth)acrylates and the above aromatic group-containing (meth)acrylates. Specific examples of the (meth)acrylic esters include methyl(meth)acrylate, ethyl (meth)acrylate, (iso)propyl(meth)acrylate, (iso- or tertiary-) butyl(meth)acrylate, (iso)amyl(meth)acrylate, cyclohexyl (meth)acrylate, benzyl(meth)acrylate, 2-ethylhexyl(meth) acrylate, (iso)octyl(meth)acrylate, (iso)decyl(meth)acrylate, (iso)dodecyl(meth)acrylate, (iso)stearyl(meth)acrylate, 2-hydroxyethyl(meth)acrylate and 3-hydroxypropyl(meth) acrylate.

Examples of the styrene-based monomer for synthesizing the (meth)acrylic-styrene-based polymers and the styrene-based polymers include those exemplified above. Among these monomers, preferred are styrene, vinyl toluene, 2-methyl styrene and chlorostyrene.

When the (meth)acrylic-styrene-based polymers are used as the emulsion polymer, the constitutional unit derived from the salt-forming group-containing monomers such as (meth)acrylic acid is contained in an amount of 0.5 to 5% by weight and preferably 0.5 to 3% by weight on the basis of the total weight of the whole monomers used, in order to enhance a stability of the water dispersion of the polymer particles. When the content of the salt-forming group-containing monomers lies within the above-specified range, the viscosity of the emulsion polymerization reaction system is reduced, resulting in simple production of stable polymer particles. The content of the constitutional unit derived from the (meth)acrylic esters is preferably 2 to 95% by weight and more preferably 15 to 80% by weight in view of a good stability of the water dispersion of the polymer particles as well as a good high lighter-fastness. The content of the constitutional unit derived from the styrene-based monomers is preferably 2 to 95% by weight and more preferably 15 to 80% by weight in view of a good stability of the water dispersion of the polymer particles as well as a good high lighter-fastness.

When the styrene-based monomer is copolymerized with the (meth)acrylic ester, the weight ratio [the styrene-based monomer:the (meth)acrylic ester] of the styrene-based monomer to the (meth)acrylic ester is preferably from 70:30 to 10:90 and more preferably from 60:40 to 30:70. The solid content in the obtained polymer particles is preferably from 1 to 80% and more preferably from 10 to 70% in view of a good stability and a good formulation property.

Production of Emulsion Polymer Particles (C)

The emulsion polymer particles (C) used in the present invention may be produced by known emulsion polymerization methods.

In view of enhancing the film-forming property and the high lighter-fastness, the emulsion polymer (C) preferably has a glass transition temperature of 50° C. or lower and preferably 30° C. or lower. Further, the glass transition temperature of the emulsion polymer (C) is preferably −70° C. or higher and more preferably −40° C. or higher in view of enhancing a strength and a high lighter-fastness of the resultant coating film.

In the water dispersion and the water-based ink, the average particle size of the emulsion polymer particles (C) is not particularly limited as long as the resultant ink is kept stable upon storage thereof. The average particle size of the emulsion polymer particles (C) is preferably from 5 to 300 nm and more preferably from 30 to 200 nm as measured at 25° C. using the above laser particle analyzing system "ELS-8000" (cumulant analysis) available from Otsuka Denshi Co., Ltd.

Water Dispersion and Water-Based Ink for Ink-Jet Printing

The water dispersion of the present invention is produced by mixing the self-dispersible pigment (A), the water dispersion of the self-emulsifiable polymer particles (B) and the water dispersion of the emulsion polymer particles (C) which are obtained by the above methods, with each other.

The water-based ink of the present invention is an ink containing the water dispersion of the present invention and using water as a main medium. The water-based ink may further contain various additives such as wetting agents, dispersants, defoaming agents, mildew-proof agents and chelating agents, if required. The method of mixing these respective components is not particularly limited.

The contents of the self-dispersible pigment (A), the self-emulsifiable polymer particles (B), the emulsion polymer particles (C) and water in the water dispersion and the water-based ink for ink-jet printing are as follows.

The content of the self-dispersible pigment (A) is preferably from 1 to 15% by weight, more preferably from 2 to 12% by weight and most preferably from 2 to 10% by weight in view of a good stability and a good optical density of the water dispersion and the water-based ink.

The content of the self-emulsifiable polymer particles (B) is preferably from 0.5 to 15% by weight, more preferably from 1 to 10% by weight, still more preferably from 1 to 8% by weight and most preferably from 2 to 7% by weight in view of a good stability of the water dispersion and the water-based ink as well as a good gloss of characters or images printed.

The content of the emulsion polymer particles (C) is preferably from 0.5 to 15% by weight, more preferably from 1 to 10% by weight, still more preferably from 1 to 8% by weight and most preferably from 2 to 7% by weight in view of a good stability of the water dispersion and the water-based ink as well as a good high lighter-fastness of characters or images printed.

The total content of the self-emulsifiable polymer particles (B) and the emulsion polymer particles (C) is preferably from 1 to 16% by weight, more preferably from 2 to 11% by weight, still more preferably from 3 to 9% by weight and most preferably from 4 to 9% by weight in view of a good stability of the water dispersion and the water-based ink as well as a good gloss and a good high lighter-fastness of characters or images printed.

The weight ratio [the self-emulsifiable polymer particles (B)/the emulsion polymer particles (C)] of the self-emulsifiable polymer particles (B) to the emulsion polymer particles (C) is preferably from 1/10 to 10/1, more preferably from 1/6 to 6/1 and most preferably 1/3 to 3/1 in view of a good gloss and a good high lighter-fastness of characters or images printed.

The weight ratio [{the self-emulsifiable polymer particles (B)+the emulsion polymer particles (C)}/the self-dispersible pigment (A)] of a sum of the self-emulsifiable polymer particles (B) and the emulsion polymer particles (C) to the self-dispersible pigment (A) is preferably from 1/10 to 2/1, more preferably from 1/5 to 1/1 and most preferably 1/3 to 1/1.

The content of water is preferably from 30 to 90% by weight and more preferably from 40 to 80% by weight.

The surface tension of the water dispersion of the present invention is preferably from 30 to 65 mN/m and more preferably from 35 to 60 mN/m as measured at 20° C., and the surface tension of the water-based ink of the present invention is preferably from 25 to 50 mN/m and more preferably from 27 to 45 mN/m as measured at 20° C.

The viscosity of the water dispersion having a solid content of 10% by weight is preferably from 2 to 6 mPa·s and more preferably from 2 to 5 mPa·s as measured at 20° C. to produce a water-based ink having a good viscosity. The viscosity of the water-based ink is preferably from 2 to 12 mPa·s and more preferably from 2.5 to 10 mPa·s in order to maintain a good ejection property thereof.

In addition, the pH of the water-based ink of the present invention is preferably from 4 to 10.

The water-based ink of the present invention is suitably applicable to a piezoelectric type ink-jet printer, though not particularly limited thereto.

EXAMPLES

In the following production examples, examples and comparative examples, the "part(s)" and "%" represent "part(s) by weight" and "% by weight", respectively, unless otherwise specified.

Production Example 1

Production of Self-Emulsifiable Polymer Particles

Twenty parts of methyl ethyl ketone and 0.03 part of a chain transfer agent (2-mercaptoethanol) together with 10% of 200 parts of a monomer mixture containing (a) methacrylic acid/(b) a styrene macromer (tradename "AS-6(S)") available from Toagosei Co., Ltd./(c) styrene/(e) polyethylene glycol methacrylate 2-ethylhexyl ether ("NK Ester EH-4G" available from Shin-Nakamura Kagaku Co., Ltd.) at a mixing weight ratio of 14/15/56/25 were charged into a reaction vessel and mixed with each other, and then the reaction vessel was fully purged with a nitrogen gas to thereby obtain a mixed solution.

Separately, remaining 90% of the monomer mixture was charged into a dropping funnel, and further 0.27 part of the chain transfer agent, 60 parts of methyl ethyl ketone and 1.2 parts of a radical polymerization initiator (2,2'-azobis(2,4-dimethylvaleronitrile)) were added thereto and mixed with each other, and the dropping funnel was fully purged with a nitrogen gas to thereby obtain a mixed solution.

The mixed solution in the reaction vessel was heated to 65° C. under stirring in a nitrogen atmosphere, and then the mixed solution in the dropping funnel was gradually dropped thereinto over 3 h. After the elapse of 2 h from completion of the dropping, a solution prepared by dissolving 0.3 part of the radical polymerization initiator in 5 parts of methyl ethyl ketone was added to the obtained reaction solution, and the resultant solution was further aged at 65° C. for 2 h and further at 70° C. for 2 h to obtain a polymer solution. Next, the thus obtained polymer solution was mixed with a given amount of methyl ethyl ketone under stirring to obtain a polymer solution having a solid content (effective content) of 50%. As a result, it was confirmed that the weight-average molecular weight of the thus obtained polymer was about 60,000.

Thirty parts of the thus obtained polymer solution was mixed with 40.0 parts of methyl ethyl ketone and 30.0 parts of acetone under stirring to prepare a uniform solution. The thus obtained solution was charged into a dropping funnel, and dropped into a reaction vessel filled with a mixture prepared by previously mixing 4.3 parts of a 5 mol/L sodium hydroxide aqueous solution, 1.2 parts of a 25% ammonia aqueous solution and 217.5 parts of ion-exchanged water with each other, over 30 min to neutralize the polymer solution. Further, the mixture was stirred for 30 min to obtain an emulsion composition. The thus obtained emulsion composition was heated at 60° C. under reduced pressure to remove the organic solvent and ammonia together with a part of water therefrom. The composition was further passed through a filter having an average pore size of 5 μm (available from Nippon Pole Co., Ltd.) to remove coarse particles therefrom, thereby obtaining a water dispersion containing the self-emulsifiable polymer particles in an amount of 20% as a solid content (effective content).

As a result, it was confirmed that the thus obtained polymer particles had D50 of 105 nm. Meanwhile, the measurement of D50 was conducted at 25° C. using the laser particle analyzing system "ELS-8000 (product number)" available from Otsuka Denshi Co., Ltd.

Production Example 2

Production of Emulsion Polymer Particles 1

A glass reactor equipped with a stirrer, a thermometer, a reflux condenser and a nitrogen feed tube was charged with 1000 g of ion-exchanged water, 62 g of polyoxyethylene alkyl ether sodium sulfate as a surfactant (product name "LATEMUL E-118B" available from Kao Corporation; effective content: 26%) and 2.4 g of potassium persulfate, and then purged with nitrogen. The reactor was then placed in a water bath to heat the contents of the reactor to 70° C. Next, 800 g of a monomer mixture containing (a) acrylic acid/(c) styrene/(c) 2-ethylhexyl acrylate at a mixing weight ratio of 2/49/49 was dropped into the reactor over 2 h, and then the contents of the reactor were aged at 80° C. for 2 h, thereby obtaining a water dispersion containing emulsion polymer particles 1. As a result, it was confirmed that the thus obtained emulsion polymer particles 1 had an average particle size of 120 nm, and the obtained water dispersion had a solid content (effective content) of 48%.

Production Example 3

Production of Emulsion Polymer Particles 2 Using Reactive Surfactant

The same procedure as defined in Production Example 2 was repeated except for using 80 g of an ether sulfate-type reactive surfactant (product name "LATEMUL PD-104" available from Kao Corporation; effective ingredient content: 20%) in place of the polyoxyethylene alkyl ether sodium sulfate, thereby obtaining a water dispersion containing emulsion polymer particles 2. As a result, it was confirmed that the thus obtained emulsion polymer particles 2 had an average particle size of 96 nm, and the obtained water dispersion had a solid content (effective content) of 48%.

Examples 1 to 8 and Comparative Examples 1 to 4

An aqueous solution of a self-dispersible carbon black (A) (tradename: "BONJET CW-2" available from Orient Kagaku Kogyo Co., Ltd.; solid content: 15%), self-emulsifiable polymer particles (B), emulsion polymer particles (C), 5 parts of glycerol, 5 parts of 2-pyrrolidone, 2 parts of isopropyl alcohol, 1 part of "ACETYLENOL EH" available from Kawaken Fine Chemicals Co., Ltd., and water were prepared and mixed with each other under stirring at 25° C. to obtain a dispersion having an ink composition as shown in Table 1. The thus obtained dispersion was filtered through a 1.2 μm-mesh filter to obtain a water-based ink.

The high lighter-fastness (1) and the gloss (2) of the thus obtained water-based ink were evaluated by the following methods. The results are shown in Table 1.

Meanwhile, in Table 1, "Others" include 5 parts of glycerol, 5 parts of 2-pyrrolidone, 2 parts of isopropyl alcohol, and 1 part of "ACETYLENOL EH" available from Kawaken Fine Chemicals Co., Ltd.

(1) High Lighter-Fastness

Text printing was carried out on a recycled paper for PPC available from Nippon Kakoseisi Co., Ltd., using an ink-jet printer "Model EM930C" (piezoelectric type) available from Seiko Epson Co., Ltd., and after passage of 3 min and 10 min, the extent of staining of the printed sample when traced with an aqueous fluorescent marker "OPTEX 1" (tradename) commercially available from Zebra Co., Ltd., was observed with naked eyes, and the evaluation was made on the basis of the following evaluation criteria.

[Evaluation Criteria]

⊚: No staining such as rubbed stains was observed when traced with a fluorescent marker.

○: Some rubbed stains were generated when traced with a fluorescent marker, but at a level without practical problems.

Δ: Generation of rubbed stains was observed when traced with a fluorescent marker.

X: Generation of rubbed stains was remarkably observed over a whole surface traced with a fluorescent marker, which is intolerable.

(2) Gloss

Solid image printing was carried out on a coated paper (photographic paper <silky> "KA420MSH (tradename)" having a 60° gloss of 18 which was commercially available from Seiko Epson Co., Ltd., using the above ink-jet printer under the following printing conditions:

Kind of Paper: Photo Printing Paper; and

Mode set: Photo.

After allowing the printed paper to stand at 25° C. for 24 h, the 60° gloss thereof was measured 5 times using a glossmeter "HANDY GLOSSMETER (tradename)" (product number: PG-1) available from Nippon Denshoku Industries Co., Ltd., to calculate an average of the measured values.

[Evaluation Criteria]

⊚: Excellent: 30 or higher

○: Good: 20 or higher but less than 30

Δ: Poor: 10 or higher but less than 20

X: Very poor: Less than 10

The 60° gloss of 20 or higher was an acceptable level upon use.

TABLE 1

| | Ink composition | | | | |
|---|---|---|---|---|---|
| | (A) Self-dispersible CB Part (%) | (B) Self-emulsifiable polymer particles Part (%) | (C) Emulsion polymer particles | | Water Part | Others Part |
| | | | Particles 1 Part (%) | Particles 2 Part (%) | | |
| Example 1 | 53 (8) | 5 (1) | 2 (1) | — | 27 | 13 |
| Example 2 | 53 (8) | 15 (3) | 6 (3) | — | 13 | 13 |
| Example 3 | 53 (8) | 15 (3) | — | 6 (3) | 5.5 | 13 |
| Example 4 | 53 (8) | 20 (4) | 8.5 (4.3) | — | 5.5 | 13 |
| Example 5 | 53 (8) | 5 (1) | 8.5 (4.3) | — | 20.5 | 13 |
| Example 6 | 53 (8) | 5 (1) | — | 8.5 (4.3) | 16 | 13 |
| Example 7 | 53 (8) | 5 (1) | 13 (6.5) | — | 16 | 13 |
| Example 8 | 53 (8) | 30 (6) | 2 (1) | — | 2 | 13 |
| Comparative Example 1 | 53 (8) | — | — | — | 34 | 13 |
| Comparative Example 2 | 53 (8) | 30 (6) | — | — | 4 | 13 |
| Comparative Example 3 | 53 (8) | — | 13 (6.5) | — | 21 | 13 |
| Comparative Example 4 | 53 (8) | — | — | 13 (6.5) | 21 | 13 |

| | Evaluation | | |
|---|---|---|---|
| | High lighter-fastness | | Gloss |
| | 3 min | 10 min | |
| Example 1 | Δ | ○ | ○ (20) |
| Example 2 | ○ | ⊚ | ⊚ (30) |
| Example 3 | ⊚ | ⊚ | ⊚ (31) |
| Example 4 | ○ | ⊚ | ○ (26) |
| Example 5 | ○ | ⊚ | ○ (22) |
| Example 6 | ⊚ | ⊚ | ○ (24) |
| Example 7 | ⊚ | ⊚ | ○ (23) |
| Example 8 | ○ | ○ | ⊚ (34) |
| Comparative Example 1 | X | X | X (8) |
| Comparative Example 2 | X | Δ | ○ (28) |
| Comparative Example 3 | Δ | ○ | Δ (18) |
| Comparative Example 4 | ○ | ⊚ | Δ (19) |

Note:
Numerals in parentheses appearing in the columns of "Ink composition" represent contents of effective ingredients in the self-dispersible carbon black and the polymer particles, respectively.

Note:
Numerals in parentheses appearing the column "Evaluation of Gloss" represent measured values.

From the results shown in Table 1, it was confirmed that the water-based inks for ink-jet printing obtained in the above Examples were excellent in high lighter-fastness and gloss as well as the balance therebetween, and the water-based ink obtained in Example 1 exhibited good high lighter-fastness and gloss which were acceptable upon actual use notwithstanding the total content of the polymer particles was smaller than those used in Comparative Examples 3 and 4.

Further, it was confirmed that the water-based inks for ink-jet printing obtained in the above Examples exhibited a sufficient optical density even upon printing on an ordinary paper.

INDUSTRIAL APPLICABILITY

The water-based ink containing the water dispersion for ink-jet printing according to the present invention, not only satisfies a high optical density but also exhibits excellent high lighter-fastness and gloss.

The invention claimed is:

1. A method for producing a water dispersion for ink-jet printing, comprising:

polymerizing an ethylenically unsaturated monomer in the presence of at least one reactive surfactant and at least one inorganic peroxide initiator to form an emulsion comprising emulsion polymer particles (C) which are particles of a polymer including reacted units of the reactive surfactant and have a glass transition temperature of 50° C. or lower;

forming a water dispersion of self-emulsifiable polymer particles (B) comprising a polymer having polymerizable units of one or more salt-forming group-containing monomers by dropping an organic solvent and a water-insoluble polymer containing one or more of monomer units having a salt-forming group-containing monomer unit (a), and at least one of a macromer monomer unit (b) and a hydrophobic monomer unit (c) into a neutralizing agent and an aqueous medium, mixing and stirring a mixture containing the water-insoluble polymer, the organic solvent, the neutralizing agent and the aqueous medium, and then removing the organic solvent from the mixture; and mixing a self-dispersible carbon black (A), the water dispersion of self-emulsifiable polymer particles (B), and the emulsion comprising the emulsion polymer particles (C) to form the water dispersion.

2. The method according to claim 1, wherein the emulsion comprising the emulsion polymer particles (C) comprises particles of one or more (meth)acrylic-styrene-based polymers.

3. The method according to claim 1, wherein a weight ratio of the self-emulsifiable polymer particles (B) to the emulsion polymer particles (C) in the water dispersion is from 1/10 to 10/1.

4. The method according to claim 1, wherein a weight ratio of the sum of the self-emulsifiable polymer particles (B) and the emulsion polymer particles (C) to the self-dispersible pigment (A) in the water dispersion is from 1/10 to 2/1.

5. The method according to claim 1, wherein the reactive surfactant is at least one selected from the group consisting of compounds represented by the following formulae (4), (5) and (6):

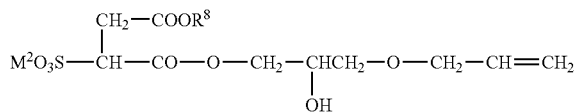
(4)

wherein $M^2$ is Na, K or $NH_4$; and $R^8$ is an alkyl group having 8 to 18 carbon atoms;

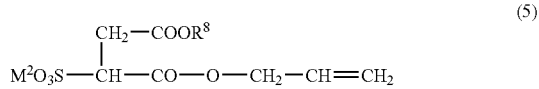
(5)

wherein $M^2$ is Na, K or $NH_4$; and $R^8$ is an alkyl group having 8 to 18 carbon atoms; and

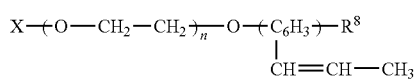
(6)

wherein X is H, $SO_3Na$, $SO_3K$ or $SO_3NH_4$; $R^8$ is an alkyl group having 8 to 18 carbon atoms; and n is an integer of 1 to 50.

6. The method according to claim 5, wherein the reactive surfactant is at least one selected from the group consisting of compounds represented, by the formulae (4) and (5).

7. The method of according to claim 1, wherein the reactive surfactant is present in an amount of from 0.1 to 10 parts by weight based on 100 parts by weight of the monomers present during the polymerizing.

8. The method of claim 1, wherein the emulsion polymer particles (C) comprise units of the reactive surfactant polymerized with the ethylenically unsaturated monomer.

9. The method according to claim 1, wherein the self-dispersible particle (A) is carbon black, the self-emulsifiable polymer particles (B) and the emulsion polymer particles (C) are acrylic acid/styrene/2-ethylhexyl acrylate polymers.

10. The method according to claim 1, wherein the emulsion polymer particle (C) is an acrylic acid/styrene/2-ethylhexyl acrylate polymer including reacted units of the reactive surfactant.

11. A water-based ink for ink-jet printing a water dispersion produced by the method claimed in claim 1.

* * * * *